United States Patent [19]
Yokota

[11] Patent Number: 5,815,474
[45] Date of Patent: Sep. 29, 1998

[54] METHODS AND APPARATUS FOR SELECTIVELY INHIBITING REPRODUCTION OF RECORDED SETS OF DATA

[75] Inventor: Teppei Yokota, Chiba, Japan

[73] Assignee: Sony Corporation, Japan

[21] Appl. No.: 33,181

[22] Filed: Mar. 16, 1993

[30] Foreign Application Priority Data

Mar. 23, 1992 [JP] Japan .................................. 4-065106

[51] Int. Cl.⁶ ........................................................ G11B 7/00
[52] U.S. Cl. .................................. 369/47; 369/54; 369/58
[58] Field of Search .................................. 369/47, 48, 54, 369/58, 53, 32; 360/77.2, 77.4

[56] References Cited

U.S. PATENT DOCUMENTS

| | | |
|---|---|---|
| Re. 33,765 | 12/1991 | Takahashi et al. ..................... 360/72.2 |
| 4,688,116 | 8/1987 | Takahashi et al. ..................... 360/72.2 |
| 4,742,507 | 5/1988 | Kuroki et al. ............................ 369/54 |
| 4,768,181 | 8/1988 | Ichinose et al. ......................... 369/54 |
| 4,774,700 | 9/1988 | Satoh et al. ............................. 369/58 |
| 4,779,252 | 10/1988 | Custers et al. .......................... 369/32 |
| 4,821,128 | 4/1989 | Inazawa et al. ....................... 360/72.2 |
| 5,202,877 | 4/1993 | Yanagida ................................. 369/58 |
| 5,235,681 | 8/1993 | Masuzaki et al. ...................... 395/164 |
| 5,325,347 | 6/1994 | Sako ......................................... 369/48 |

Primary Examiner—Thang V. Tran
Attorney, Agent, or Firm—Limbach & Limbach L.L.P.

[57] ABSTRACT

A disc recording and reproducing apparatus and method in which a plurality of sets of independent data are recorded on a recording area of a disc and informations representing recording states of the sets of data are recorded on a lead-in section of the disc, wherein, when an unnecessary set of data is masked, only reproduction of the unnecessary set of data is inhibited while a recording order thereof is kept unchanged.

8 Claims, 3 Drawing Sheets

F I G. 1A
(PRIOR ART)

Data (1) | Data (2) | Data (3) | Data (4) | Data (5)

Delete

F I G. 1B
(PRIOR ART)

Data (1) | Data (2) | ///// | Data (3) | Data (4)

FIG. 3A

| Data (1) | Data (2) | Data (3) | Data (4) | Data (5) |

Masking (bracketing Data(3) and Data(4))

FIG. 3B

| Data (1) | Data (2) | Data (3) (Masked) | Data (4) | Data (5) |

METHODS AND APPARATUS FOR SELECTIVELY INHIBITING REPRODUCTION OF RECORDED SETS OF DATA

BACKGROUND OF THE INVENTION

1. Field of the Invention

The present invention generally relates to disc recording and reproducing apparatuses and methods, more particularly, is directed to a disc recording and reproducing apparatus and method for recording and reproducing pieces of music etc. by using a magneto-optical disk of a small size, for example.

2. Description of the Prior Art

A disc system called a mini disc (MD) system has been proposed in which pieces of music, etc., are recorded and reproduced by using a magneto-optical disc of a small size, for example, as disclosed in Japanese Patent Application No. 3-275067.

In the mini disc system, there is a demand for deleting data such as a piece of music once recorded on the mini disc. In this case, as is conventional, when a set of data (3) is deleted from a plurality sets of data recorded on the mini disc as shown in FIG. 1A, for example, recording orders of the sets of data succeeding to the set of data (3) are respectively advanced by one as shown in FIG. 1B.

When, for example, a plurality of sets of independent data such as pieces of music, etc., are recorded on a disc, the user sometimes memorizes a particular set of data thereamong by remembering its recording order. However, if the recording orders of the succeeding sets of data are advanced by deleting a set of data as described above, the user can not directly access the particular set of data based on its recording order when the user wants to take out the particular set of data, so that the operability of the apparatus is poor.

OBJECTS AND SUMMARY OF THE INVENTION

Therefore, it is an object of the present invention to provide an improved disc recording and reproducing apparatus and method in which the aforementioned shortcoming and disadvantage encountered with the prior art can be eliminated.

More specifically, it is an object of the present invention to provide a disc recording and reproducing apparatus and method which can directly access a particular set of data based on its recording order even when an unnecessary set of data is set so as not to be reproduced.

As a first aspect of the present invention, there is provided a disc recording and reproducing apparatus in which a plurality of sets of independent data are recorded on a recording area of a disc and information representing recording states of the sets of data is recorded on a lead-in section of the disc, wherein when an unnecessary set of data is masked, only reproduction of the unnecessary set of data is inhibited while a recording order thereof is kept unchanged.

As a second aspect of the present invention, there is provided a disc recording and reproducing method in which a plurality of sets of independent data are recorded on a recording area of a disc and information representing recording states of the sets of data are recorded on a lead-in section of the disc, the method includes a step of masking an unnecessary set of data in a manner that only reproduction of the unnecessary set of data is inhibited while a recording order thereof is kept unchanged.

According to the present invention, since when the unnecessary set of data is masked by operating an operation unit for masking, only reproduction of the unnecessary set of data is inhibited while a recording order thereof is kept unchanged, the recording orders of the plurality of sets of data are not changed even if the masking operation is performed, so that the conventional problem in operability of the apparatus and method can be eliminated.

The preceding and other objects, features, and advantages of the present invention will become apparent from the following detailed description of an illustrative embodiment thereof when read in conjunction with the accompanying drawings.

BRIEF DESCRIPTION OF THE DRAWINGS

FIGS. 1A and 1B are schematic diagrams illustrating recording orders of sets of data on a disc in the conventional disc system;

FIG. 3A and 3B are schematic diagrams illustrating recording orders of sets of data on a disc in the disc recording and reproducing apparatus according to the embodiment of the present invention.

DETAILED DESCRIPTION OF THE PREFERRED EMBODIMENT

Figure 2:
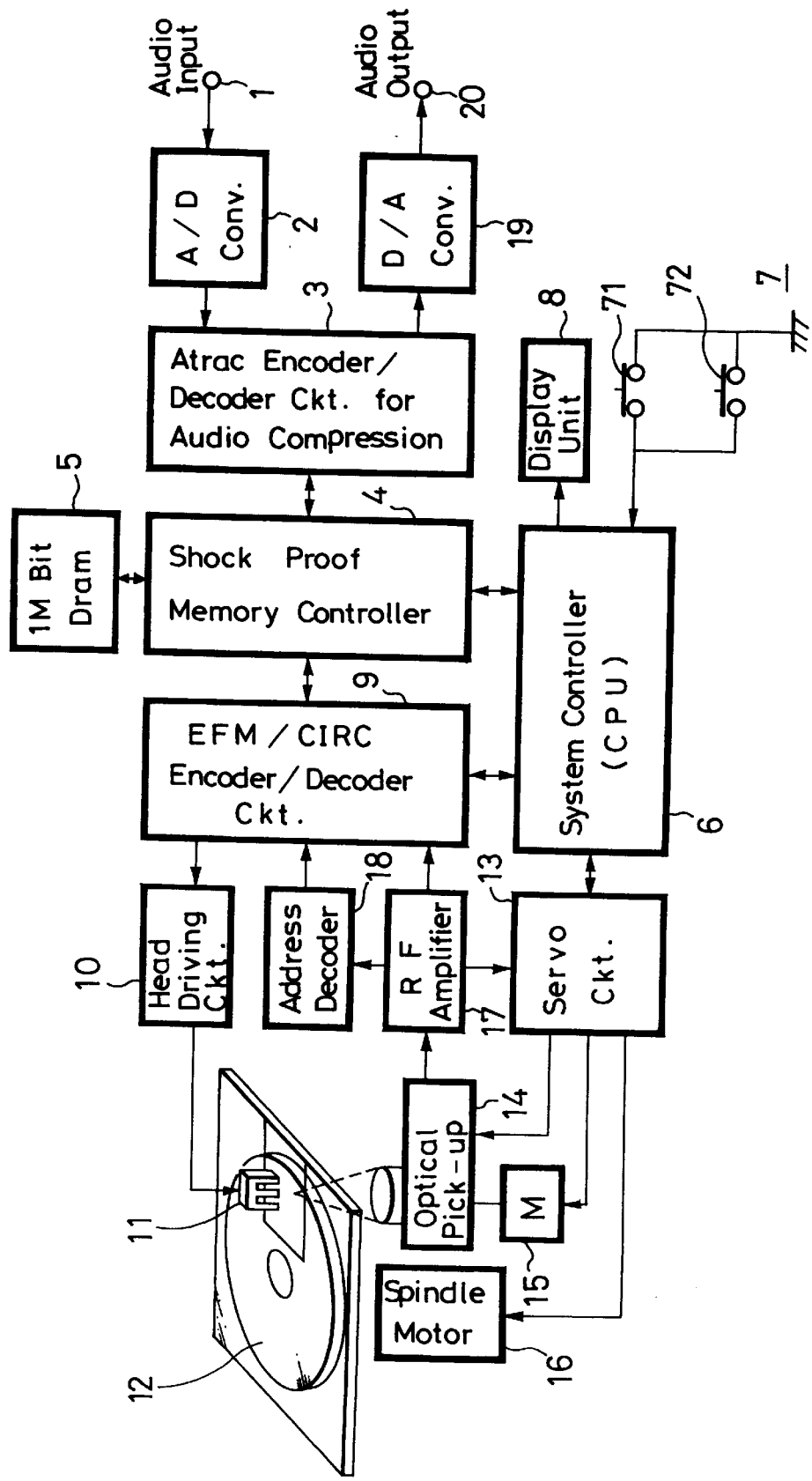
FIG. 2 shows in block form an arrangement of a disc recording and reproducing apparatus according to an embodiment of the present invention.

A disc recording and reproducing apparatus and method according to the embodiment of the present invention will now be described with reference to FIGS. 2, 3A and 3B, in which case, the present invention is applied to the mini disc system.

FIG. 2 shows an arrangement of the embodiment of the present invention. Referring to FIG. 2, an audio signal inputted at an input terminal 1 is applied to an analog-to-digital (A/D) converter circuit 2 and then converted into digital data therein. The digital data is then applied to an adaptive transform acoustic coding (ATRAC) encoder/decoder circuit 3 for audio compression, and an encoded data from the encoder/decoder circuit 3 is applied to a dynamic random access memory (DRAM) 5 with a capacity of 1M bits through a shock proof memory controller 4.

A central processing unit (CPU) 6 for system control controls the recording and reproducing apparatus entirely in response to a signal applied thereto from an operation unit 7 and further control states of the apparatus etc., are thereby displayed on a display unit 8. The operation unit 7 has an operation button 72 for masking as well as an operation button 71 for mask cancellation.

The CPU 6 communicates with the shock proof memory controller 4 so that, when a predetermined amount of data is stored in the DRAM 5, the predetermined amount of data is read out from the DRAM 5 and recorded on the mini disc. That is, the data read out from the DRAM 5 through the shock proof memory controller 4 is supplied to an encoder/decoder circuit 9 for eight to fourteen modulation (EFM) and error-correction coding or cross interleave Reed Solomom coding (CIRC) used for recording, which in turn encodes the data and supplies the encoded data to a head driving circuit 10. Thus, magnetic field generated by a recording head 11 is changed in accordance with the encoded data and applied to a mini disc 12 from the upper surface side thereof.

Further, a signal from the CPU 6 is applied to an optical pick-up 14 through a servo circuit 13, so that a laser light or beam is irradiated on the mini disc 12 from the lower surface side thereof at a predetermined timing. In this case, a feeding motor 15 for the optical pick-up 14 and a spindle motor 16 for the mini disc 12 are driven under the control of signals supplied thereto from the servo circuit 13. In this manner, the audio signal applied to the input terminal 1 is recorded on the mini disc 12.

Upon reproduction, on the other hand, a signal from the optical pick-up 14 is applied to the encoder/decoder circuit 9 through a radio frequency (RF) amplifier 17. A signal from the RF amplifier 17 is supplied to an address decoder 18, in which a cluster number corresponding to the aforesaid absolute address is discriminated. The thus discriminated cluster number is applied from the address decoder 18 to the CPU 6 through the encoder/decoder circuit 9. Thus, the optical pick-up 14 is moved to a recording region of the mini disc at which desired data is recorded.

Further, data decoded by the encoder/decoder circuit 9 is supplied to the DRAM 5 through the shock proof memory controller 4. When a predetermined amount of data is stored in the DRAM 5, the predetermined amount of data is read out of the DRAM 5 in response to a signal from the CPU 6 and supplied to the encoder/decoder circuit 3, in which the read data is decoded and supplied to a digital to analog (D/A) converter circuit 19 to thereby be converted into an analog signal. The analog signal is taken out from an output terminal 20 for an audio signal, for example. In this manner, the data recorded on the mini disc 12 is reproduced and taken out from the output terminal 20.

Further, when masking of a set of data (3), for example, is designated by the operation button 72 for masking among the plurality of sets of data shown in FIG. 3A, the set of data (3) is masked with remaining the recording order thereof as shown in FIG. 3B. Thus, only the reproduction of the set of data (3) is inhibited.

Accordingly, in the thus constituted disc recording and reproducing apparatus, when a plurality of sets of independent data such as pieces of music, etc., are recorded, for example, on a single mini disc and the user remembers a recording order of a particular set of data among them, the recording orders of the plurality of sets of data can not be changed even if an arbitrary set of data is masked. Thus, in a case of taking out the particular set of data, the aforesaid particular set of data can be directly accessed on the basis of the recording order thereof, so that the operability of the apparatus can be improved.

According to the thus constituted disc recording and reproducing apparatus of the embodiment, since the recording orders of sets of data are not changed even if a set or sets of data is masked, the conventional problem in operability can be eliminated.

In the thus constituted apparatus, the masked set of data can be restored or reproduced by the cancellation of the masking operation which is performed by operating the operation button 71 for mask cancellation, thereby the operability of the apparatus can be further improved.

Further, the total number of sets of data to be recordable can be decreased by masking a set of data.

Furthermore, in the thus constituted apparatus, both data being masked and data not being masked may be displayed on the display unit 8 in different manners so that they can be distinguished from each other.

As set out above, according to the present invention, since the recording orders of sets of data are not changed even if a set or sets of data is masked, the conventional problem in operability can be eliminated.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A disc recording and reproducing apparatus comprising:

means for receiving independent sets of data to be recorded;

means for encoding each set of data for recording onto a disc, the disc having a lead-in section for recording thereon of recording state information regarding each set of data and a recording area for recording thereon of each encoded set of data;

a magnetic head for recording onto the recording area of the disc each encoded set of data and for recording onto the lead-in section of the disc recording state information regarding each set of data, the recording state information including reproduction information indicating whether to inhibit reproduction of any recorded encoded set of data; and controller means for selectively masking an unnecessary recorded encoded set of data by changing the reproduction information to indicate inhibition of reproduction of such set of recorded encoded data while retaining the information indicating the order of recording, and for selectively cancelling the masking of a masked recorded encoded set of data by changing the reproduction information to indicate non-inhibition of reproduction of such set of recorded encoded data while retaining the information indicating the order of recording.

2. The disc recording and reproducing apparatus according to claim 1, wherein the controller means decreases a total number of sets of data which can be recorded by masking a set of recorded encoded data.

3. The disc recording and reproducing apparatus according to claim 1, further comprising:

display means operative to display a masked recorded encoded set of data in a different manner than a recorded encoded set of data.

4. The disc recording and reproducing apparatus according to claim 1, further comprising:

an operation unit operative to initiate masking by the controller means in response to an input to the operation unit.

5. The disc recording and reproducing apparatus according to claim 1 further comprising:

an operation unit operative to initiate cancellation of masking by the controller means in response to an input to the operation unit.

6. A disc recording and reproducing method comprising the steps of:

receiving independent sets of data to be recorded;

encoding each set of data for recording onto a disc, the disc having a lead-in section for recording thereon of recording state information regarding each set of data and a recording area for recording thereon of each encoded set of data;

recording onto the recording area of the disc each encoded set of data and recording onto the lead-in section of the disc recording state information regarding each set of data, the recording state information including reproduction information indicating whether to inhibit reproduction of any recorded encoded set of data;

selectively masking an unnecessary recorded encoded set of data by changing the reproduction information to indicate inhibition of reproduction of such set of recorded encoded data while retaining the information indicating the order of recording; and selectively cancelling the masking of a masked recorded encoded set of data by changing the reproduction information to indicate non-inhibition of reproduction of such set of recorded encoded data while retaining the information indicating the order of recording.

7. The disc recording and reproducing method according to claim 6, further comprising the step of:

providing an input to an operation unit to thereby initiate masking by the controller means.

8. The disc recording and reproducing method according to claim 6, further comprising the step of:

providing an input to an operation unit to thereby initiate cancellation of masking by the controller means.

* * * * *